United States Patent
Nicholson et al.

(10) Patent No.: US 8,341,664 B2
(45) Date of Patent: *Dec. 25, 2012

(54) SYSTEM AND METHOD OF SELECTIVE ADVERTISING ON A TV CHANNEL

(75) Inventors: Robert D. Nicholson, Vienna, VA (US); Barrie A. Saunders, Montgomery Village, MD (US)

(73) Assignee: Road Runner HoldCo LLC, Herndon, VA (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/943,087

(22) Filed: Nov. 10, 2010

(65) Prior Publication Data

US 2011/0061073 A1 Mar. 10, 2011

Related U.S. Application Data

(63) Continuation of application No. 09/753,127, filed on Dec. 30, 2000, now Pat. No. 7,856,644.

(51) Int. Cl.
| | |
|---|---|
| H04N 7/16 | (2011.01) |
| H04N 5/445 | (2011.01) |
| H04N 7/10 | (2006.01) |
| H04N 7/173 | (2011.01) |
| G06F 3/00 | (2006.01) |

(52) U.S. Cl. ............... 725/32; 725/9; 725/14; 725/36; 725/140

(58) Field of Classification Search ............ 725/9, 14, 725/32, 36, 42, 46, 140, 34, 105, 152, 132, 725/139

See application file for complete search history.

(56) References Cited

U.S. PATENT DOCUMENTS

| | | | | |
|---|---|---|---|---|
| 4,602,279 | A * | 7/1986 | Freeman | 725/35 |
| 5,155,591 | A * | 10/1992 | Wachob | 725/35 |
| 6,119,098 | A * | 9/2000 | Guyot et al. | 705/14.61 |
| 7,856,644 | B2 * | 12/2010 | Nicholson et al. | 725/32 |
| 2002/0019831 | A1 * | 2/2002 | Wade | 707/500 |
| 2011/0061073 | A1 * | 3/2011 | Nicholson et al. | 725/34 |

* cited by examiner

*Primary Examiner* — Pankaj Kumar
*Assistant Examiner* — Reuben M Brown
(74) *Attorney, Agent, or Firm* — The Marbury Law Group, PLLC

(57) ABSTRACT

A method and system for providing selective advertising on a television channel is accomplished by downloading appropriate advertisements from an advertising server to a subscriber's set top box over an out-of-band channel. The set top box monitors for events. When an event occurs, the set top box signals the head-end to download ads to the set top box. The ads may be selected using demographic or common channel preference pattern information associated with the set top box.

12 Claims, 3 Drawing Sheets

SYSTEM AND METHOD OF SELECTIVE ADVERTISING ON A TV CHANNEL

CROSS REFERENCE TO RELATED APPLICATIONS

This application is a continuation of application Ser. No. 09/753,127 filed Dec. 30, 2000 now U.S. Pat. No. 7,856,644. The Ser. No. 09/753,127 application is incorporated herein by reference in its entirety for all purposes.

BACKGROUND

Providing advertising to consumers has long been the subject of much research, especially in how to best provide appropriate advertising to the relevant consumer market. For example, a manufacturer selling automobiles would not likely be well satisfied when such advertising is only provided on a children's channel. Since both the interest and market power of children for such a product would be low. Further, certain demographic markets within the country have different desires for goods and services. Therefore, even during certain prime time hours, the same advertising might yield greater or lesser success depending upon the region of the country in which the advertising is actually run.

Much research has shown that when advertising is customized to individual markets, and even to individual viewers, that the response to such advertising is much greater. Since advertisers continually search for the most efficient way to spend advertising dollars, a tremendous need exists to ensure that particular advertisements are served to an audience that is most likely to respond favorably to such advertisements.

Network television over the years has attempted to target its advertisement based upon the potential viewers for a particular program at a particular hour. However, with the advent of cable television, and the local and regional markets that are served by individual cable operators, the potential exists to provide advertisement that is much more targeted to the individuals within a particular cable system. Distribution of programming and advertisement occurs through a set top box, which is connected, directly to the viewer's television. These set top boxes have become increasingly sophisticated over the years, such that they now contain both processing capability and memory for storage of instructions and other content.

What would therefore be truly useful is a system and method that uses the capabilities of the set top box to receive and manage, together with the cable operator's server operations, advertisements that are presented to individual viewers or groups of users. Thus, a more targeted advertising campaign can be offered to merchants desiring to reach a more appropriate audience with their advertisements and advertising budgets.

SUMMARY

It is therefore an object of the present invention to provide targeted advertising to consumers via a cable network system.

It is a further objective of the present invention to provide advertising over a cable network system that is targeted to specific groups or individuals who are subscribers to the cable system.

It is yet another objective of the present invention to provide advertisements without the need for broadcasting of such advertisements over an entire cable network system.

It is yet another objective of the present invention to serve advertisements to viewers associated with a live video stream.

It is a further objective of the present invention to provide targeted advertisements to viewers associated with a live video stream without the need for a large complex multiplexing system.

It is yet another objective of the present invention to utilize the set top box for a particular viewer to store advertisements to be displayed to the viewer.

It is a further objective of the present invention to use the set top box for providing signaling to an advertising server to provide advertising to a viewer at a particular time.

It is a further objective of the present invention to employ the set top box to store advertisements that are appropriate to the channel being viewed by a viewer.

It is yet another objective of the present invention to utilize the set top box for serving advertisements to viewers when browser applications are being employed.

These and other objectives of the present invention will become apparent to those skilled in the art by a review of the specification that follows.

The present invention is a system and method for serving advertisements to individual viewers or groups of viewers on a cable network system. The present invention allows a cable network operator to select specific advertisements that would be displayed on a viewer's TV screen, depending upon who the specific set top box is assigned to, and upon the channel that is being viewed by the viewer at a particular time.

The system basically comprises a set top box, a cable operator headend, and an advertising server/carousel. The advertising server holds formatted advertisements with appropriate indicator information assigning the ads to specific channels of content. The advertising server delivers advertisements to the set top box when the set top box is first turned on during a particular viewing session by the viewer and periodically thereafter.

The set top box comprises signaling and storage means such that signals can be provided to the cable operator headend, and so that advertisements that are downloaded from the advertising server can be stored in the set top box for subsequent display to the user, or stored in other home server type of storage networked to the set top box.

Individual subscriber information is stored at the cable operator headend and advertising server such that certain demographic, or common channel preference pattern information concerning the individual viewer may be stored and correlated with the advertisements to be served to that particular viewer.

Advertisements that are stored in the advertising server have associated channel information stored along with the advertisement. In this fashion, advertisements that are appropriate to children's channel are so flagged. Similarly, advertisements that relate to the content of other channels are also flagged so that advertisements appropriate to the channel being viewed are downloaded to the set top box.

When the set top box is first turned on and periodically there after, advertisements are downloaded to the set top box. When a viewer views a particular channel, advertisements that are identified with that specific channel are chosen from those stored on the set top box and subsequently displayed to the viewer.

In the event that the set top box has limited memory, and therefore is not capable of holding a large number of advertisements for any particular channel, the set top box can signal the cable operator headend each time that a channel is changed. Thereafter, the advertising server and cable operator headend will serve advertisements to the viewer, depending upon the channel that is being viewed. Alternatively only advertising associated with a set of channels that the viewer commonly spends time viewing can downloaded with high probability of being the set of advertisements needed on the set top box.

Actual delivery of the advertisement to the TV screen is accomplished by an application that runs on the set top box, and which notes the time slot availability for the display of advertisements during the course of any video programming. Thus, video content is displayed for the viewer and, upon an appropriate advertising trigger indicating when an advertising slot is available, the set top box serves the appropriate advertisement to the viewer depending upon the channel that is being viewed.

Data for the advertisement is passed to the set top box via the out-of-band channel via Quadrature Phase Shift Key (QPSK) or on one of the inband channels via Quadrature Amplitude Modulation (QAM). These modulations are a preferred embodiment, but do not limit the invention to use of other out-of-band or in-band modulations such as DOCSIS.

The end result of this process is a more selective control for presenting advertising to viewers which is targeted not only to the local cable operator market but is also capable of being served based upon individual viewer's demographic information. This system is capable of being used not only with normal television programming but can also be used with Internet browser and browser-like applications. In addition, the cable operator can introduce advertising to individual viewers without having to insert the advertising into a broadcast feed, along with the video content that is to be displayed to the viewer.

DETAILED DESCRIPTION

The present invention comprises a system and method for presenting advertisements to individual viewers on a cable network system without the need for multiplexing equipment. To provide customization of advertising for each individual user in the cable head end would require a large set of complex multiplexing equipment, and potentially be a very inefficient use of bandwidth resources while using the set top in this manner creates a more scalable solution for targeted selective advertising.

Figure 1:
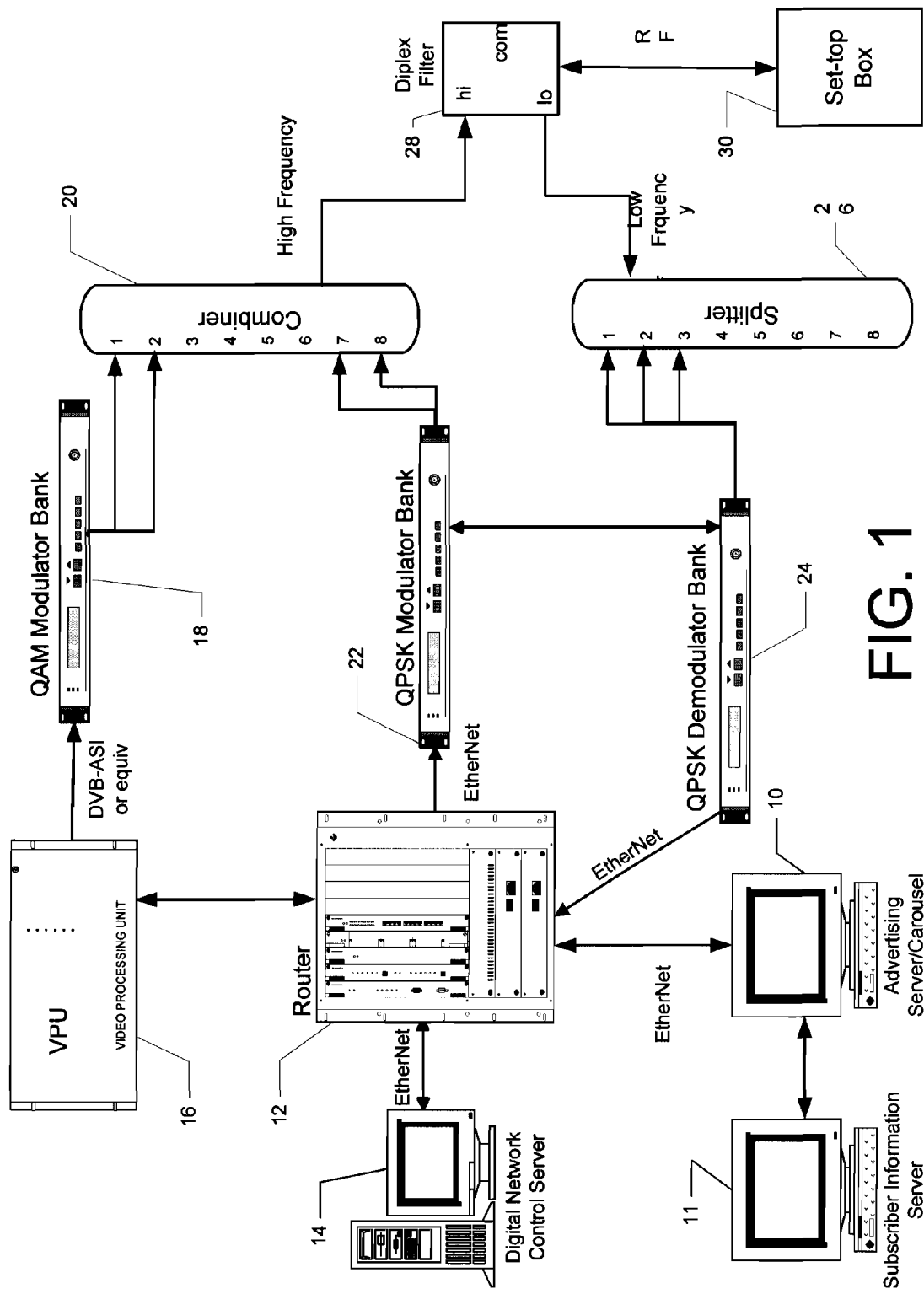
FIG. 1 illustrates the overall architecture of the present invention.

Referring first to FIG. 1, the overall architecture of the present invention is illustrated. The system of the present invention comprises an advertising server 10, holding a variety of advertisements that are to be displayed to viewers of a cable network system. Advertisements on the advertising server 10 have channel association associated with each advertisement. This channel information provides a tag that identifies a specific advertisement as being appropriate for display on a particular channel when that channel is being viewed by an individual viewer/subscriber.

In addition to simple channel-based advertisement selection, wherein advertisements for display are selected by a "channel id," it is also possible to select a group or subgroup of advertisements for display at particular times, which may or may not be tied to a channel or group of channels. Initially, advertisements are stored on the advertising server and are downloaded to the set-top when any of the following download triggers occur:

When the set-top box is initially "booted," i.e., this download trigger will come from the set-top box when it finished the "boot" process;

When the set-top box changes to another channel (and remains on that channel for a given length of time e.g. >5 seconds;

When a time download trigger occurs, e.g., when the time changes from 6:59 p.m. to 7.00 p.m. (presumably indicating a "programming change" on a particular channel); this download trigger may come from either the advertising server itself or from the set-top box;

When a set-top box explicitly requests an advertisement or group of advertisements from the advertising server; this download trigger may occur at any time but is pre-empted by the other download triggers previously described; and By detecting a unique program identifier PID in the in-band program stream.

The advertising server 10 is connected to the system router or switch 12 which in turn is connected to and controlled by a digital network controller 14. Video signals for programming and content are sent via a video processing unit 16, which provides some of the multiple broadcast bands of a variety of video channels. This video processing unit 16 is a standard available piece of networking equipment such as the Broadband Integrated Gateway from Scientific Atlanta, whose characteristics are incorporated herein by reference in their entirety.

The video content is sent via a QAM in channel modulator bank 18 to a combiner 20, which in turn combines and sends the video signals to filter 28 for subsequent distribution to an individual viewer's set top box 30.

Individual advertisements can reach the set top box for subsequent storage via several paths. When set top box 30 is first turned on during a particular viewing session, a signal is sent via filter 28 via out-of-band signal to splitter 26. The signal is demodulated via out of band QPSK demodulator bank 24. The signal from the set top box 30 is then provided to router 12, which in turn provides the information that set top box 30 is now online to advertising server 10. These modulations are a preferred embodiment, but do not limit the invention to use of other out-of-band or in-band modulations such as DOCSIS or any particular frequency spectrum relationship between the in-band and out-of-band channels.

Once advertising server 10 receives the signal from set top box 30 identifying the particular user/subscriber, the advertisements that are appropriate to that particular user/subscriber and to the variety of channels to which the user/subscriber subscribes, are identified based on information stored on server 10 or optional subscriber information server 11. The identified advertisements and channels are sent via router 12 through out-of-band QPSK modulator bank 22 to combiner 20. Thereafter, appropriate advertisements are sent through filter 28 to set top box 30 where they are stored.

As noted earlier, all advertising that is served from advertising server 10 and stored on set top box 30 is tagged with a channel tag, which identifies the channel that is associated with the advertisement. Set top box 30 comprises instructions for storing the tagged advertisement and for displaying the advertisement that is associated with a particular channel only when that particular channel is being viewed. Set top box 30 delivers video, audio, graphics, or other static content to a display device that is served by the cable operator headend to the set top box over a particular channel. When and advertising trigger indicative of an advertising "opportunity" occurs, set top box 30 serves the appropriately tagged advertisement to the user's television screen. In one embodiment, when set top box 30 senses a signal from a cable operator headend that an advertising trigger is present, an advertising opportunity is beginning and which television channel is being viewed; then set top box 30 retrieves an advertisement that is tagged to the viewed television channel and displays the advertisement on the television set. In this manner, an advertisement is displayed that is appropriate to the viewed channel as well as being selective to the viewer. Timing of advertisement and length of advertisement can be keyed to a start time and total advertising time that is available for the particular advertising opportunity.

In the event that set top box 30 or other network accessible local storage does not have sufficient capacity to store a number of advertisements, the system of the present invention can also operate upon a signal that is presented by set top box 30 in real time to the cable operator headend.

In the case where set top box 30 does not have sufficient memory for storage of multiple advertisements, whenever a particular channel is being viewed by a user/subscriber, set top box 30 provides an appropriate signal via filter 28, to splitter 26 over QPSK demodulator bank 24 through router 12 to advertising server 10 which then serves the appropriate advertisement in real time or via carousel to the viewer via the video processing unit 16 through inband QAM modulator bank 18 through combiner 20, filter 28 to set top box 30 for display on the user's screen.

Alternatively, advertisements can be displayed via out-of-band channel and via QPSK modulator bank 22 through combiner 20, filter 28, and to the set top box 30 for subsequent display. Thus, advertisements may be sent to set top box via either the out-of-band channel via QPSK modulator or on one of the inband channels via QAM modulators.

Alternatively, subsets of the total advertisements may be delivered in real time or for storage via the same channels depending on algorithms associated with historical viewing habits or other subscriber information.

Figure 2:
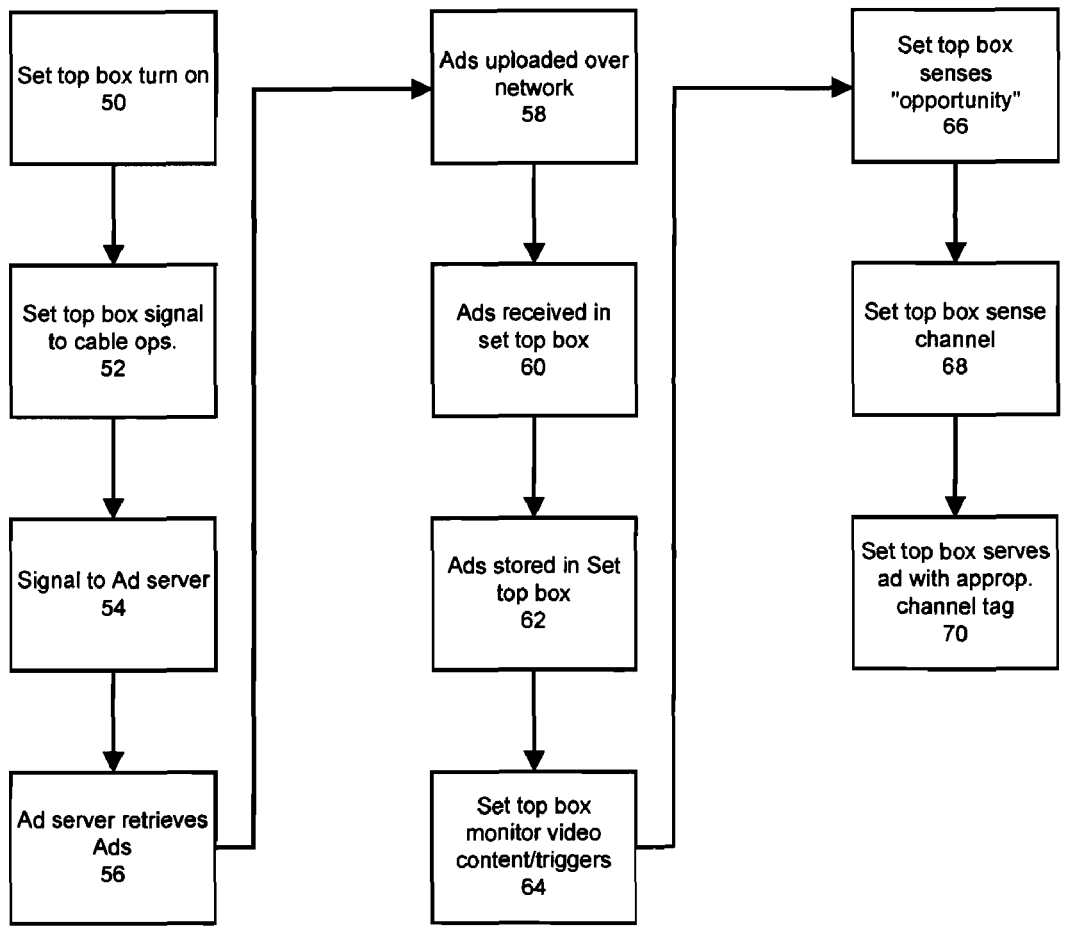
FIG. 2 illustrates the overall flow for exchange of data and advertisements for one embodiment of the present invention.

Referring to FIG. 2, the overall flow for exchange of data and advertisements of the present invention is illustrated. Set top box is first turned on 50 and provides a signal 52 over the cable network to the cable operator headend that the set top box is online and ready to receive advertisements.

The signal is conveyed to advertising server 10 that receives the signal 54. The signal from set top box 30 comprises information that relates to the individual viewer identifying the individual viewer and the address to which all subsequent communication is to be conveyed.

Based upon the individual viewer identification, the advertising server retrieves advertising 56 based upon viewer information that is stored at the advertising server or optional subscriber information server. Advertising server 10 identifies the various channels to which the user subscribes. This is important since the user may be a subscriber to a basic service or may also have subscribed to certain premium channels which would then imply the need for serving additional different advertisements to that particular user. Advertising server 10 retrieves the ads that are appropriate to the channels subscribed to by the viewer and also appropriate to the demographics or other subscriber information of the particular viewer.

Advertisements that are retrieved by the advertising server are uploaded over the cable TV system 58 and transmitted to the set top box 60 of the particular viewer. As noted earlier, advertisements are tagged with an appropriate channel and other tags that might be useful for the display of the advertisement. For example, a time slot during the day is also an appropriate tag for an advertisement since programming changes during the course of the day to accommodate different viewer groups who might be viewing a particular channel during a 24-hour period.

Set top box receives and stores the tagged advertisement 62 for subsequent display during the course of the viewing day. Thereafter, set top box monitors the transmission of video content 64 as well as displays the content in the usual fashion.

When set top box senses a signal from the cable operator headend that an advertising trigger is present 66, the set top box senses the fact that an advertising opportunity is beginning, senses the channel which the viewer is currently watching 68, and retrieves from local storage or carousel and displays an advertisement that is tagged to the channel that the user is currently watching 70. The advertisement is thus displayed appropriate to the channel that is being viewed by the viewer.

Figure 3:
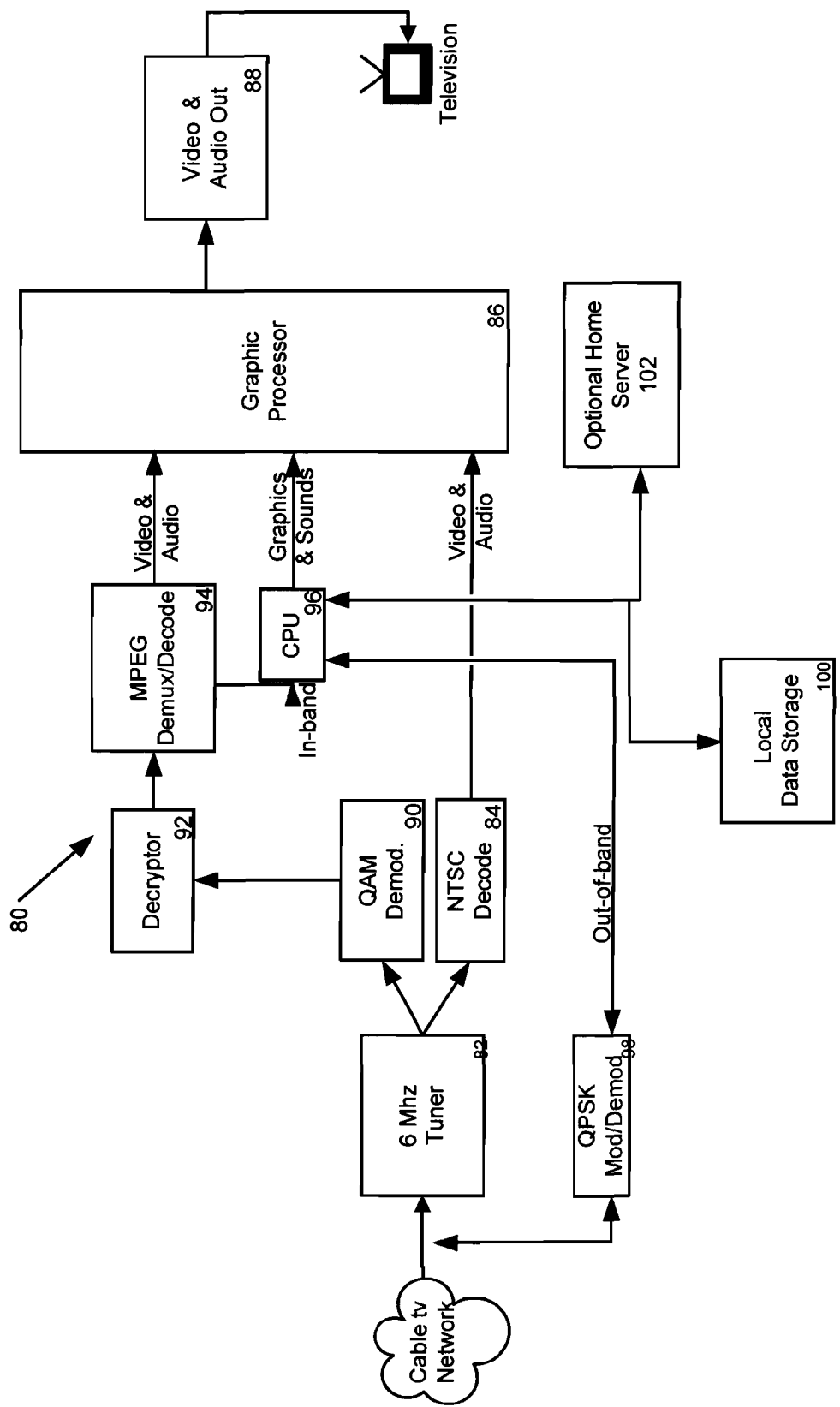
FIG. 3 illustrates a typical arrangement for a set top box used in the present invention.

FIG. 3 illustrates a typical arrangement for a set top box used in the present invention. The set top box 80 comprises a 6-mega hertz tuner 82. Signal is presented to an NTSC decoder 84 which provides video and audio to a graphics processor 86. Video and audio is then output 88 for subsequent display on the television. Additionally, signal from the tuner 82 is presented to QAM demodulator 90. The signal is then decrypted 92 and the resultant digital stream is presented to MPEG demultiplexer/decoder 94 which provides a video and audio stream to the graphics processor 86 for subsequent video output 88. In band graphics and sound are also sent from MPEG demultiplexer/decoder 94 through CPU 96 to provide graphics and sounds to the graphics processor 86 for subsequent video and audio output 88. QPSK modulator/demodulator 98 allows out of band communication via the set top box. Local storage 100 or an optional home server 102 provide the means to store the advertisements and/or instructions.

Set top boxes having the potential for the interactions noted in the present invention are currently available. For example, scientific-Atlanta explorer 2000 set top box currently has the processing power to support the present invention.

A system and method for the display of targeted advertisement over a cable network has been illustrated. It will be appreciated by those skilled in the art that other variations of the present invention are possible without departing from the scope of the invention as disclosed. Such variations could include different methods of tagging and identifying advertisements to be displayed, when the advertisement is ready to be displayed, and the channels over which advertisements are to be displayed. For example, a particular advertisement may be displayed over multiple channels but not all channels of a cable system. Thus tags for advertisements can comprise tags associated with more than one video channel.

Another modification could include storing profiles on multiple viewers at a subscriber location and requiring login to identify the viewer. Additionally, with the continued convergence of television and computers, although the invention has been described above with reference to a set-top-box, for purposes of this disclosure, the term "set-top-box" is defined to include other devices including the required elements of the disclosed set-top-box, whether separate from a television or not, including, but not limited to, TV tuner-equipped computers and digital televisions that have the necessary CPU and storage means Likewise, although the invention has been described with respect to a cable television system/network, these terms are herein defined to include any network for delivery of streaming audio/video services to subscribers, whether wired or wireless. The present invention is therefore limited only by the scope of the claims appended hereto.

What is claimed is:

1. A method of selecting advertising for display on a subscriber-selected television channel using a set top box comprising:
   detecting an occurrence of an event at the set top box, wherein the event is selected from the group consisting of a change of channel, a change of channel coupled with continuous viewing for a minimum time period, and a change of time, wherein the change of time is indicative of the commencement of a program on the subscriber-selected television channel;
   sending a download trigger signal responsive to the event from the set top box via an out-of-band-channel to a headend;
   receiving the download trigger signal at the headend;
   selecting one or more advertisements for download to the set top box using demographic or common channel preference pattern information associated with the set top box;
   sending the selected advertisements to the set top box in response to receipt of the download trigger signal, wherein the sending response occurs in real-time following the receiving of the download trigger signal;
   storing the advertisements in a local storage of the set top box;
   receiving at the set top box at a time determined at the headend an advertising trigger signal sent from the headend via the out-of-band channel; and
   substituting at the set top box an advertisement retrieved from the local storage for a television broadcast feed in response to receipt of the advertising trigger signal.

2. The method of claim 1, wherein the advertisement is appropriate to the subscriber-selected television channel.

3. The method of claim 1, wherein sending a download trigger signal from the set top box via an out-of-band-channel comprises sending a download trigger signal from the set top box via a first out-of-band-channel, and wherein receiving at the set top box an advertising trigger signal sent from the headend via the out-of-band channel comprises receiving at the set top box an advertising trigger signal sent from the headend via a second out-of-band channel.

4. The method of claim 1 further comprising:
   reading a tag, wherein the tag associates each of the advertisements with at least one of the subscriber's subscribed television channels;
   using the tag to select an advertisement associated with the subscriber-selected channel; and
   substituting the selected advertisement for the broadcast feed.

5. A system for selecting advertising for display on a subscriber-selected television channel using a set top box comprising:
   a cable television network;
   a set top box connected to the cable television network, wherein the set top box is configured with software executable instructions to cause the set top box to perform operations comprising:
      detecting the occurrence of an event, wherein the event is selected from the group consisting of a change of channel, a change of channel coupled with continuous viewing for a minimum time period, and a change of time, wherein the change of time is indicative of the commencement of a program on the subscriber-selected television channel; and
      sending to the headend a download signal responsive to the event via an out-of-band-channel;
   a head end comprising an advertising server, wherein the head end is configured with software executable instructions to cause the head end to perform operations comprising:
      receiving the download trigger signal;
      selecting one or more advertisements for download to the set top box using demographic or common channel preference pattern information associated with the set top box;
      retrieving advertisements from the advertisement server; and
      sending the advertisements to the set top box in response to receipt of the download trigger signal, wherein the sending response occurs in real-time following the receiving of the download trigger signal; and
      sending an advertising trigger signal to the set top box at a time determined at the headend,
   wherein the set top box comprises local storage and is further configured with software executable instructions to cause the set top box to perform operations comprising:
      receiving from the advertising server at the headend the advertisements;
      storing the advertisements in the local storage;
      receiving at a time determined at the headend an advertising trigger signal sent from the headend via the out-of-band channel; and
      substituting at the set top box an advertisement retrieved from the local storage for a television broadcast feed in response to receipt of the advertising trigger signal.

6. The system of claim 5, wherein the advertisement is appropriate to a subscriber-selected television channel.

7. The system of claim 5, wherein the download trigger is sent via a first out-of-band channel and the advertising trigger is sent via a second out-of-band channel.

8. The system of claim 5, wherein the advertisements further comprise a channel tag associating each of the advertisements with at least one of the subscriber's subscribed television channels and wherein the set top box is further configured with software executable instructions to cause the set top box to perform operations comprising:
   reading a tag;
   using the tag to select an advertisement associated with the subscriber-selected television channel; and
   substituting the selected advertisement for the broadcast feed.

9. A method of selecting advertising for display on a subscriber-selected television channel using a set top box comprising:
   detecting an occurrence of an event at the set top box, wherein the event is selected from the group consisting of a change of channel, a change of channel coupled with continuous viewing for a minimum time period, and a change of time, wherein the change of time is indicative of the commencement of a program on the subscriber-selected television channel;
   sending a download trigger signal responsive to the event from the set top box via an out-of-band-channel to a headend;
   receiving the download trigger signal at the headend;
   selecting one or more advertisements for download to the set top box using demographic or common channel preference pattern information associated with the set top box;
   sending advertisements to the set top box in response to receipt of the download trigger signal, wherein the sending response occurs in real-time following the receiving of the download trigger signal;

receiving at the set top box the advertisements from the headend;

making a determination whether the set top box has sufficient local storage capacity to store the retrieved advertisements;

when the set top box has sufficient local storage capacity to store the retrieved advertisements, then:

storing the retrieved advertisements in the local storage capacity;

receiving at the set top box at a time determined at the headend an advertising trigger signal sent from the headend via the out-of-band channel; and substituting at the set top box an advertisement retrieved from the memory for a television broadcast feed in response to receipt of the advertising trigger signal; and when the set top box has insufficient memory to store the retrieved advertisements then:

selecting at the advertising server an advertisement; and serving the advertisement to the set top box via an in-band channel for display on a television connected to the set top box in real-time.

10. The method of claim 9, wherein sending a download trigger signal from the set top box via an out-of-band-channel comprises sending a download trigger signal from the set top box via a first out-of-band-channel, and wherein receiving at the set top box an advertising trigger signal sent from the headend via the out-of-band channel comprises receiving at the set top box an advertising trigger signal sent from the headend via a second out-of-band channel.

11. The method of claim 9, wherein the advertisement is appropriate to the subscriber-selected television channel.

12. The method of claim 9 further comprising:

reading a tag, wherein the tag associates each of the advertisements with at least one of the subscriber's subscribed television channels;

using the tag to select an advertisement associated with the subscriber-selected channel; and substituting the selected advertisement for the broadcast feed.

\* \* \* \* \*